United States Patent [19]

Galbraith et al.

[11] 4,272,301
[45] Jun. 9, 1981

[54] TIRE CLEANING SYSTEM WITH TIRE SPREADER

[75] Inventors: Lyle D. Galbraith; Hudson Stewart, both of Kirkland; Jon M. Congdon, Redmond, all of Wash.

[73] Assignee: Rockcor, Inc., Redmond, Wash.

[21] Appl. No.: 140,612

[22] Filed: Apr. 15, 1980

Related U.S. Application Data

[63] Continuation of Ser. No. 903,964, May 8, 1978, abandoned, which is a continuation of Ser. No. 751,605, Dec. 17, 1976, abandoned.

[51] Int. Cl.³ .......................... B08B 1/04; B08B 9/00; B60C 25/14
[52] U.S. Cl. .......................................... 134/8; 134/16; 134/18; 134/23; 134/45; 134/56 R; 134/123; 15/302; 15/21 D; 254/50.2; 254/50.4
[58] Field of Search ................... 134/8, 16, 18, 19, 21, 134/23, 33, 45, 56 R, 95, 123, 152, 153; 15/21 D, 302; 254/50.1, 50.2, 50.3, 50.4; 118/72, 73, 318; 427/230, 233, 316, 444

[56] References Cited

U.S. PATENT DOCUMENTS

| | | | |
|---|---|---|---|
| Re. 14,765 | 12/1919 | Urbach | 254/50.2 |
| 1,420,371 | 6/1922 | Emmons | 34/104 X |
| 1,471,787 | 10/1923 | Gammeter | 118/318 |
| 1,474,654 | 11/1923 | Urbach | 118/318 |
| 2,088,542 | 7/1937 | Westin | 427/233 |
| 2,700,624 | 1/1955 | Wagner et al. | 427/233 |
| 2,872,740 | 2/1959 | Schaevitz | 34/105 X |
| 3,311,085 | 3/1967 | Smith | 118/318 |
| 3,542,340 | 11/1970 | Peisl | 254/50.3 |
| 3,790,134 | 2/1974 | Matteuzzi | 254/50.2 |
| 3,825,965 | 7/1974 | Root et al. | 15/21 D |
| 3,962,987 | 6/1976 | Brandl | 118/318 X |
| 3,977,358 | 8/1976 | Stroobants | 118/318 X |
| 4,025,981 | 5/1977 | Root et al. | 15/21 R |

FOREIGN PATENT DOCUMENTS

| | | |
|---|---|---|
| 2197347 | 3/1974 | France . |
| 167628 | 2/1965 | U.S.S.R. ................. 118/318 |

*Primary Examiner*—Richard V. Fisher
*Attorney, Agent, or Firm*—Dowrey & Cross

[57] ABSTRACT

The cleaner includes an elevator for moving a tire vertically toward a stationary cleaning head which is made up of spreader rollers for spreading the tire beads a sufficient distance to admit a powered cleaning brush, along with cleaning fluid application and removal apparatus, into the tire interior during such tire movement. The elevator further supports and rotates the tire with respect to the brush during cleaning while the spreader rollers, together with additional fixed guide rollers, maintain the tire vertical and in alignment with the brush. The elevator lifts each tire from a horizontal conveyor which alternately discharges a cleaned tire and receives a fresh one. During cleaning, the brush is movable transversely along an arcuate path within the tire interior at selected contact pressure and is driven alternately in opposite directions. The cleaner is suited for usage in a system for producing self-healing tires.

14 Claims, 10 Drawing Figures

TIRE CLEANING SYSTEM WITH TIRE SPREADER

This is a continuation of application Ser. No. 903,964, filed May 8, 1978 which, in turn, was a continuation of application Ser. No. 751,605, filed Dec. 17, 1976, both abandoned.

BACKGROUND OF THE INVENTION

This invention relates to systems and methods for producing self-healing tires and to tire cleaners suited for use therewith.

Tire cleaners are used in the production of self-healing tires to remove mold release compounds and contaminants from the interior surfaces of the tire in preparation for application of an air barrier coating or sealant. Early tire cleaners of this type included a movable brush which was insertable manually within the tire casing as disclosed in U.S. Pat. No. 1,863,764. A more recent tire cleaner of this type is disclosed in U.S. Pat. No. 3,849,819. The apparatus disclosed in these patents, however, are uneconomical from the standpoints of labor costs and product quality because the brush cleaning operation is controlled manually. The apparatus disclosed in U.S. Pat. No. 3,825,965, while offering certain automated features, affords unsatisfactory tire cleaning in many practical cases because the brush is moved with respect to the tire and is pressed against the interior tire surface using a complicated linkage which often yields insufficient brush contact or scrubbing pressure. Furthermore, the brush itself often offers less than satisfactory mechanical abrasion of the interior tire surface because it is merely rolled thereacross. Another problem with the device disclosed in the latter patent arises when it is desired to clean a transversely flattened tire in which the tire beads are at close clearance. In this instance, it is difficult to obtain a proper air seal with respect to the rotatable rims for inflating the tire.

SUMMARY OF THE INVENTION

This invention provides a system and method for producing self-healing tires and a tire cleaner suited for use therewith. The cleaner of this invention affords highly effective, yet economical tire cleaning by moving tires with respect to stationary or fixed position tire cleaning means which are insertable within the tire casing by appropriate movement of the tire while simultaneously spreading the tire beads, if necessary, to admit the cleaning means into the tire interior.

According to one preferred embodiment of the invention, a tire is movable vertically with respect to the cleaning means by an elevator which supports and rotates the tire adjacent the cleaning means during the cleaning process. At the beginning of each cleaning cycle, a horizontal conveyor receives a fresh tire and moves it into position to be lifted by the elevator. At the termination of each cleaning cycle, the conveyor receives a cleaned tire from the elevator and discharges it prior to receiving a fresh tire for a subsequent cleaning cycle.

According to further aspects of the invention, the cleaning means includes a powered brush which is mounted from a fixed position support frame for transverse movement within the tire at a selected contact pressure with an interior tire surface, together with fluid application and removal apparatus. Movable spreader rollers engage and spread the tire beads to admit the brush into the tire interior during elevation of the tire by the elevator. Fixed guide rollers engage the tire when completely elevated and assist the spreader rollers in maintaining the tire vertical and in proper alignment with the brush during rotation by the elevator. The elevator further provides a flat tire support surface corresponding in width to the width of the tire tread and underlying the brush contact area. The support surface preferably is movable and is constituted by the outer surface of an endless belt which, when rotated, imparts rotational motion to the tire with resepect to the brush. In this instance, the spreader and guide rollers maintain the tire in fixed translational position with respect to the belt, while simultaneously therewith permit the tire to rotate with respect to the brush during cleaning.

In system for producing self-healing tires, this invention utilizes the aforementioned tire cleaner in combination with a tire sealant applicator. The system may further include appropriate heating means for heating a tire after cleaning and before sealant application, after sealant application, or both, depending upon the type of cleaning agent used, sealant used, temperature conditions and other factors.

Thus it will be appreciated from the foregoing summary that this invention provides a highly versatile yet economic tire cleaner which, in combination with an appropriate tire sealant applicator, or applicator and heating means, provides a highly economical system and method for producing self-healing tires. As will be further appreciated, the provision of a powered fixed position brush which is insertable within a tire by moving the tire with respect thereto overcomes or substantially mitigates problems associated with prior tire cleaners in which the brush is movable with respect to the tire. With this invention, therefore, superior brush contact pressures are obtained for highly effective and economic tire cleaning. The preferred tire support surface construction, in combination with the spreader and guide rollers, further provide stable rotational support for a tire while maintaining it vertical and in alignment with the brush. This invention further is capable of cleaning transversely flattened tires in which the tire beads are at close clearance, the spreader rollers being insertable between and capable of spreading even closely spaced tire beads.

These and other features, objects and advantages of the present invention will become apparent in the detailed description and claims to follow, taken in conjunction with the accompanying drawings.

DETAILED DESCRIPTION OF THE DRAWINGS

Figures 1, 2:
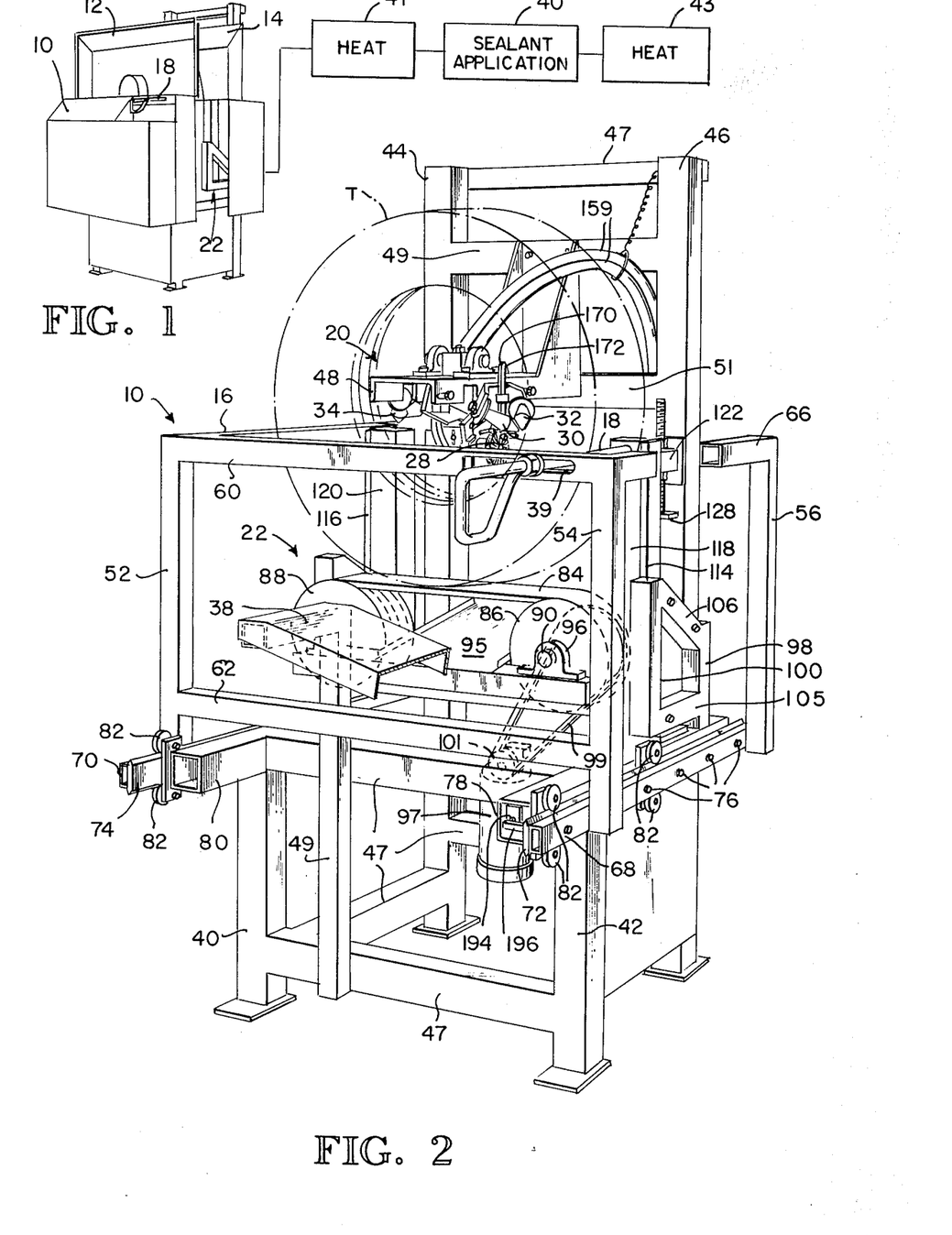
FIG. 1 is a rear side perspective view of the tire cleaner of this invention, together with a block diagram representation of the system for producing self-healing tires according to this invention.
FIG. 2 is a perspective view generally similar to FIG. 1 with parts broken away.

The system and method for producing self-healing tire according to this invention, together with the tire cleaner for use therewith, are illustrated in FIG. 1 of the drawings. The FIG. 1 cleaner removes mold release agents, band ply lubricants and other contaminants from the interior surface or surfaces of a tire in preparation for subsequent sealant application. In the illustrated example, tires are manually loaded into a horizontally movable tire drawer (generally referenced by numeral 10) in which a tire "T" is supported vertically between opposed vertical support plates 12, 14 and rests upon fixed horizontal support member 16 and retractable horizontal stop 18. (The tire drawer is illustrated in FIG. 1 in its open or retracted position, and is illustrated in FIG. 2 with parts broken away in its closed or advanced position.) In the open position of drawer 10, the tire is spaced from but aligned coaxially with a stationary cleaning head (generally referenced by numeral 20) as depicted schematically in FIG. 6; in the closed position of drawer 10, the cleaning head is inserted within the tire wheel opening in coaxial alignment therewith and is spaced radially from the tire beads and adjacent interior surfaces. Although the drawer is movable manually between its open and closed positions, it could be moved correspondingly by suitable automatic drive means if desired.

Figure 4:
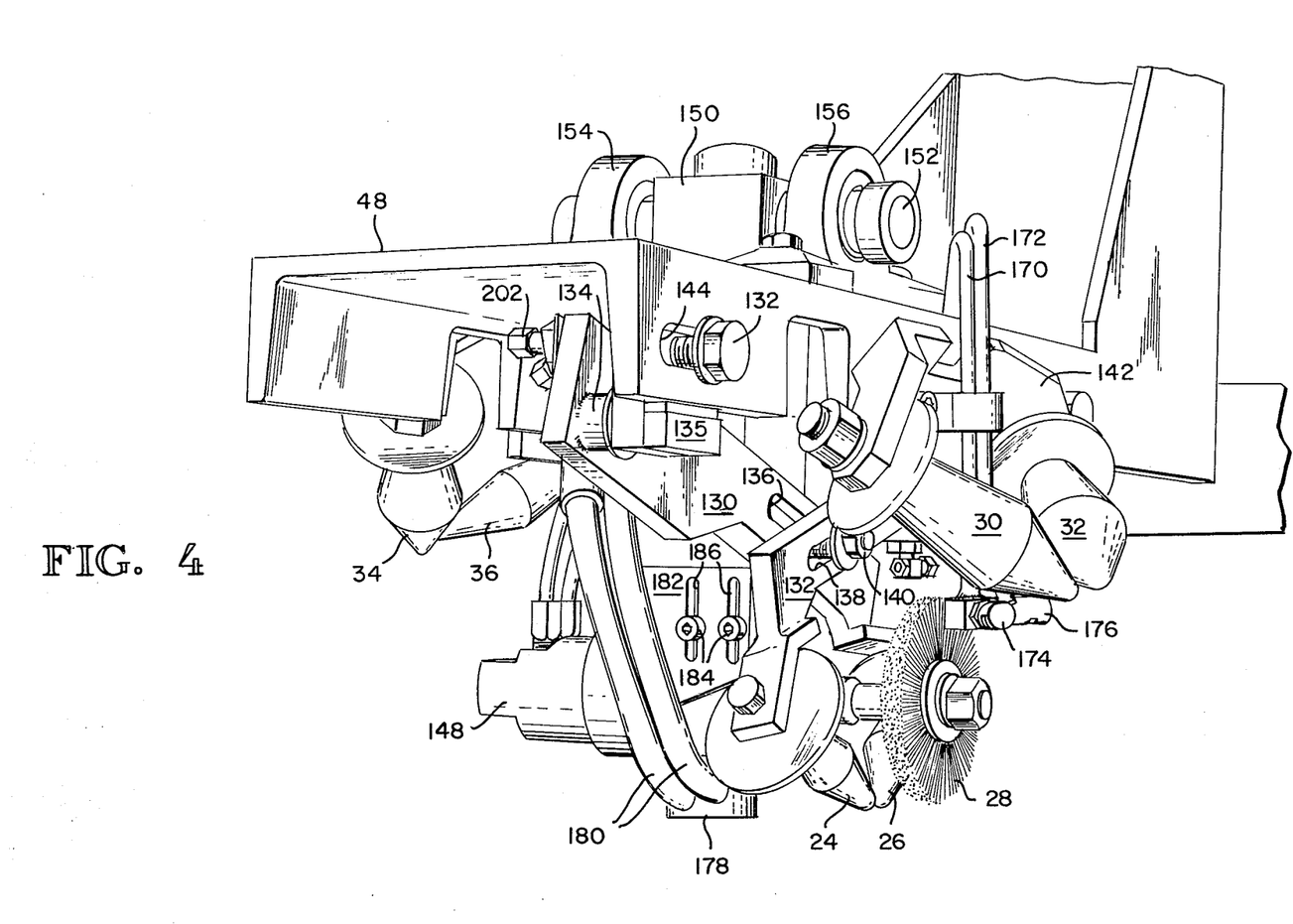
FIG. 4 is a rear side perspective view in enlarged scale of the cleaning head of the FIG. 2 cleaner.
Figure 5:
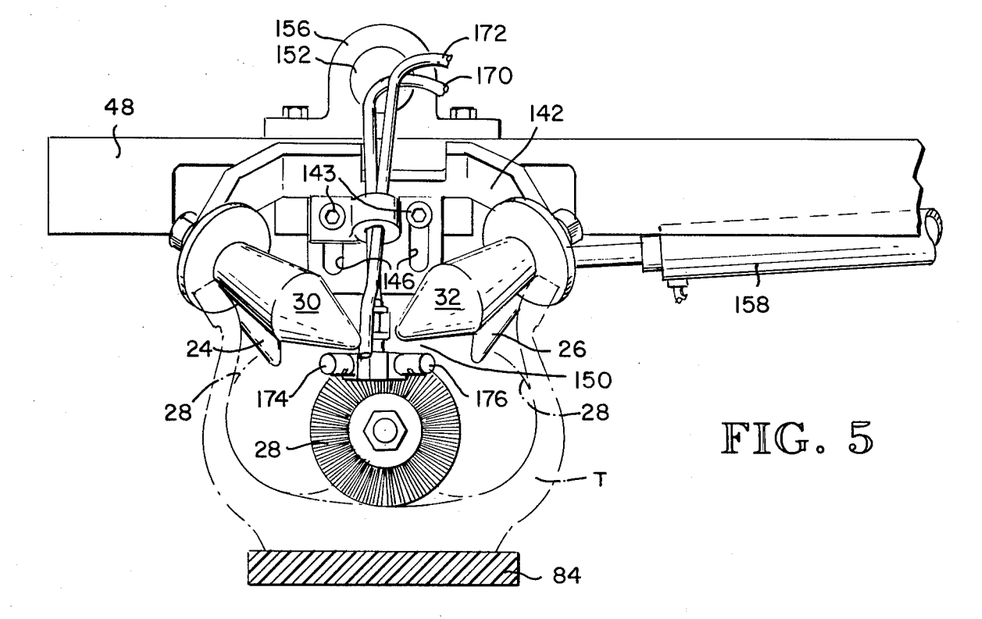
FIG. 5 is a rear side elevation of the FIG. 4 cleaning head, depicting a tire in position for cleaning.
Figure 6:
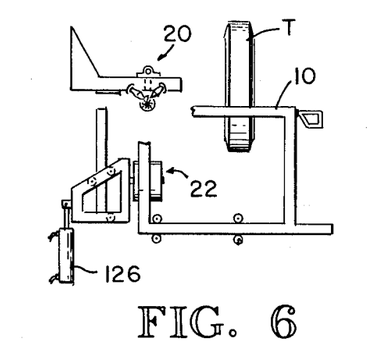
FIG. 6 is a schematic outline of the FIG. 1 cleaner, depicting the tire drawer open and supporting a fresh tire, with the elevator lowered.
Figure 7:
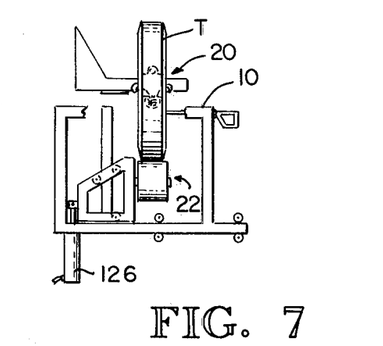
FIG. 7 is a schematic outline generally similar to FIG. 6, depicting the tire drawer closed, and supporting a fresh tire in coaxial alignment with the cleaning head, with the elevator lowered.
Figure 8:
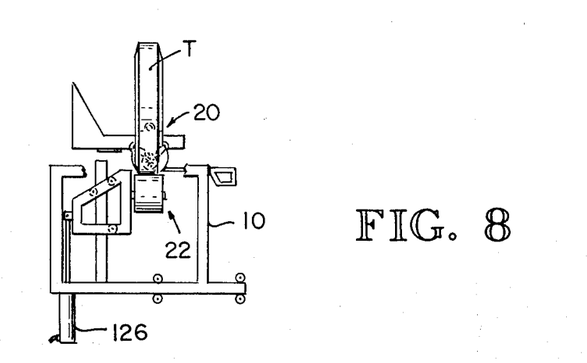
FIG. 8 is a schematic outline generally similar to FIG. 6, depicting the tire drawer closed, with the elevator raised and supporting a tire in position for cleaning with the cleaning head admitted into the tire between spread apart tire beads.

Following loading of a fresh tire and closure of the tire drawer as illustrated schematically in FIGS. 6 and 7, an elevator (generally referenced by numeral 22) lifts the tire from the tire drawer and moves it vertically toward the stationary cleaning head, as depicted schematically in FIG. 8. The cleaning head 20 is mounted in fixed vertical alignment with elevator 22. It includes two movable spreader rollers 24, 26 (FIG. 4) for engaging and spreading the tire beads a distance sufficient to admit a powered cleaning brush 28, along with cleaning fluid application and removal apparatus, into the tire interior during such vertical movement of the tire by the elevator. (The spreader rollers are illustrated in FIG. 4 in position ready for engagement with a tire and are illustrated in FIG. 5 in their spread apart position.) The elevator further supports and rotates the tire with respect to the brush during cleaning while the spreader rollers, together with four additional fixed guide rollers, 30, 32, 34, 36, maintain the tire vertical and in alignment with the brush while preventing translational movement of the tire along the elevator. Following tire cleaning, the elevator lowers the cleaned tire and repositions it upon the tire drawer which thereupon may be moved back toward its open or retracted position of FIG. 1. The tire then may be discharged by retracting stop 18 manually and allowing the tire to drop upon an inclined discharge ramp 38 (partially shown in FIG. 2) along which the tire rolls downward (to the right as illustrated in FIG. 2) and out the rear discharge end of the cleaner. To accommodate tires of different sizes, the position of stop 18 may be varied along elongated slot 39. The stop 18, of course, could be retracted automatically, or appropriately automated tire unloading apparatus substituted for stop 18, or ramp 38, or both.

In a system for producing self-healing tires, the FIG. 1 cleaner may be combined with appropriate sealant application apparatus 45. If required by the type of cleaning agent used, sealant used, temperature conditions and other factors, of course, appropriate heating apparatus 41 may be provided for heating the tires subsequent to cleaning and prior to sealant application. Likewise, additional heating apparatus 43 may be provided for heating the tire subsequent to sealant application.

Figure 3:
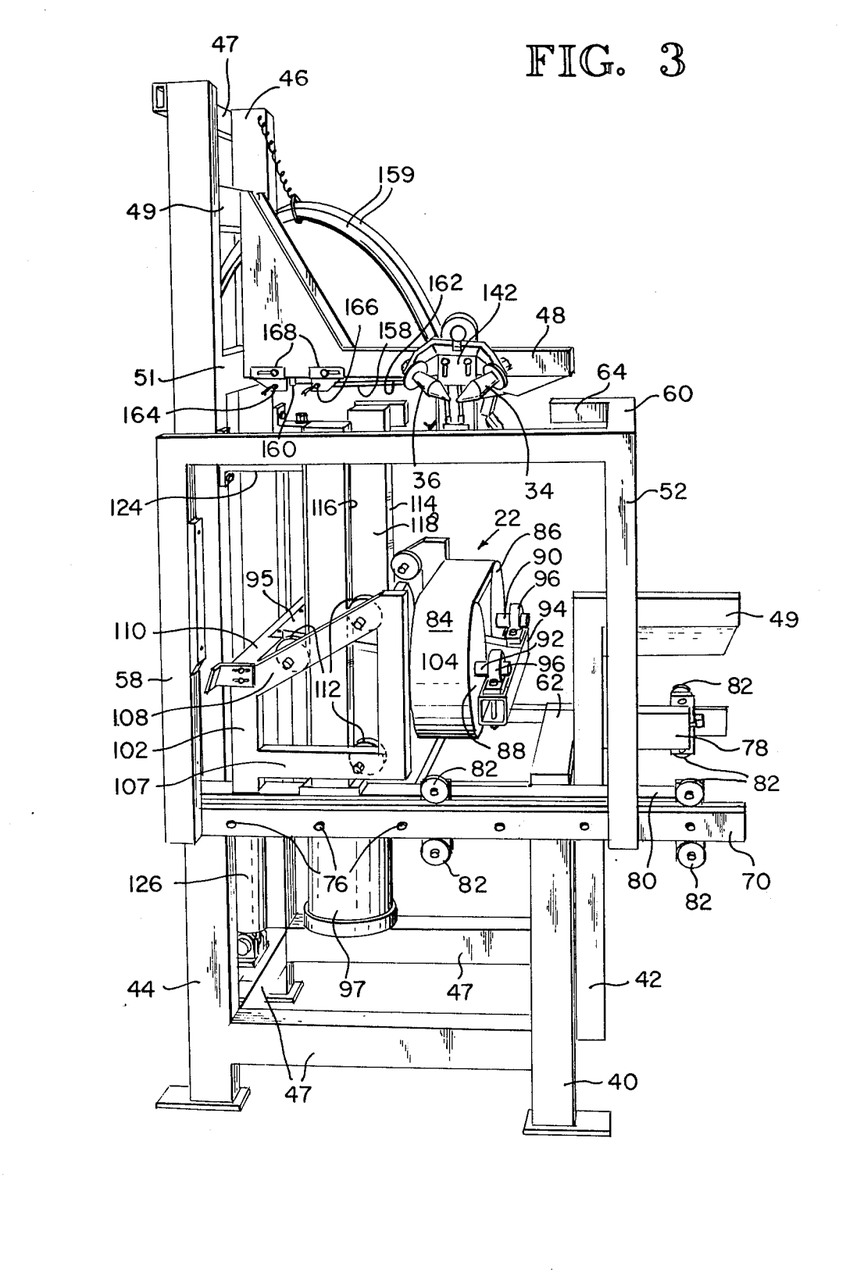
FIG. 3 is a front end elevation of the FIG. 2 cleaner.

Referring now in particular to FIGS. 2 and 3, the cleaner includes a base structure made up of two reduced height vertical corner members 40, 42; two full-height vertical corner members 44, 46; and horizontal transverse brace members 47 therebetween. Upper and lower horizontal mounting members 49, 51 are secured between corner members 44, 46 and support a mount 48 which mounts the cleaning head 20 in the fixed position illustrated. The upper end of ramp 38 is mounted from L-shaped member 50 secured to the base structure, as shown (FIGS. 2, 3). The lower end of ramp 38 (not shown) is similarly supported.

Still referring to FIGS. 2 and 3, tire drawer 10 includes a tire supporting frame made up of vertical members 52, 54, 56, 58; upper and lower horizontal side members 60, 62; member 16; and upper horizontal end members 64, 66 respectively projecting toward one another from the upper ends of members 54 and 56, as shown (FIG. 2). End members 64, 66 terminate at sufficient transverse spacing that a tire may pass therebetween as it rolls down and off the ramp 38. The tire support frame is mounted upon lower horizontal drawer slide members 68, 70 secured to the lower ends of members 52, 54, 56 and 58, as shown (FIG. 2). Horizontal V-guides 72, 74 are respectively secured by bolt connectors 76 or other appropriate means to members 68, 70. Horizontal roller mounting members 78, 80 project transversely from the aforementioned base structure and mount opposed pairs of V-type guide rollers 82 which engage and rotatively support the guide rails for horizontal reciprocative movement of the drawer.

Still referring to FIGS. 2 and 3, the elevator is constituted by a movable endless belt 84, the upper run of which forms a horizontal tire support surface corresponding in width approximately to the width of the tire tread, as shown (FIG. 5). The belt is mounted by and is movable rotatively by two horizontally spaced guide rollers 86, 88. The guide rollers 86, 88 are supported rotatively for rotational movement about respective transverse horizontal axes by mounting shafts 90, 92, the ends of which are mounted between two transversely spaced apart horizontal elevator support members 94 (one member not shown) by opposed pairs of pillow blocks 96. The belt 84 is driven about rollers 86, 88 by drive motor 97 which is connected with roller 86 by a drive belt 99, as shown (FIG. 2). A suitable pneumatic clutch controls the driving effort applied by motor 97 to belt 84.

The elevator belt and attendant support members are movable vertically between a lowered position (FIG. 7) and an elevated position (FIG. 8). The support members 94 are mounted by intermediate inclined connector structure 95 from a movable carriage made up of vertical members 98, 100, 102, 104; lower horizontal members 105, 107; upper inclined members 106, 108; and connecting brace member 110 secured to structure 95. Members 105, 106, 107, 108 rotatively support appropriate V-type guide rollers 112. These rollers ride up and down along respective vertical V-type guide rails 114, 116 which are mounted by vertical elevator slide members 118, 120 upstanding from members 78 and 80. The upper ends of members 118, 120 are secured to members 44, 46 by braces 122, 124. The belt and its attendant support members are movable vertically along guide rails 114, 116 by a double acting reciprocative actuator 126 (FIG. 3) mounted vertically by the base frame underneath and connected to member 110. At the elevated position of FIG. 8, the upper surface of member 110 engages and is positioned by a stationary stop 128 (FIG. 2) threadably mounted by member 122, as shown (FIG. 2). Stop 128 limits and, hence, effectively determines the elevated position of the elevator. In order to accommodate tires of varying sizes, this stop is adjustable vertically in order to adjust the elevated position of the elevator accordingly.

During cleaning, the tire is rotated by the drive belt at a selected rotational velocity, depending upon the type and size of the tire being cleaned. The spreader rollers, in combination with the guide rollers, maintain the tire vertical and in proper alignment with the brush during cleaning. These rollers further maintain the tire in a fixed translational position with respect to the cleaning head brush 28; yet permit the tire to rotate with respect to the brush during cleaning. The tire support surface formed by the illustrated belt construction further affords stable support for the tire in underlying relation to the point of contact of brush 28 with the tire interior surface being cleaned.

The cleaning head of this invention will now be described in further detail with reference to FIGS. 4 and 5. Referring first to FIG. 4, the movable spreader rollers 24, 26 are supported by a scissors linkage made up of support arms 130, 132 respectively secured rotatively thereto. The upper ends of these arms are pivotally mounted adjacent the rear interior face of mount 48 by respective pins 134 and associated pivot blocks 135 secured to mount 48 by bolts 137 through slots 144 (mount associated with arm 132 not shown). Arms 130, 132 are thus movable relatively about spaced apart pivot points along respective substantially coincident vertical planes. The intermediate portions of these arms include elongated slots 136, 138. A pin connector 140 extends through these slots and maintains them in adjacent registry so that, when rollers 24, 26 are subjected to respective vertical forces in response to engagement with respective opposed tire beads during elevation of a tire, the rollers and their respective support arms will swing oppositely about connector 140 along respective arcuate paths, thereby spreading the tire beads toward the fully spread position illustrated in FIG. 5. At this position, the guide rollers 30, 32, 34, 36 engage the upper edges of the tire beads and positively position the tire adjacent the cleaning head. These rollers are supported in pairs from the end faces of mount 48 by fixed double arm supports 142 secured to mount 48 by bolts 143 (FIG. 5). To accommodate tires of varying sizes, the spreader roller support pins 134 may be secured at selected positions by adjustment of blocks 135 and bolts 137 along slots 144 (one slot not shown) in order to vary the arcuate paths travelled by rollers 24, 26, or the guide rollers may be secured at selected vertical positions along vertical slots 146 by adjustment of supports 142 and bolts 143.

The brush 28 is suspended pivotally below mount 48 to swing with respect thereto about a horizontal pivot axis substantially perpendicular to the axis of rotation of a tire adjacent the cleaning head. A motor 148 drives the brush about a rotational axis below and parallel to this pivot axis. In the illustrated example, the brush is so suspended by a double acting reciprocative actuator 150. The upper end of actuator 150 is pivotally supported from the top surface of mount 48 by a horizontal pivot shaft 152, the ends of which are supported rotatively by pillow blocks 154, 156. The actuator 150 extends vertically downward through an appropriate opening (not shown) in mount 48 and is secured to the brush motor 148. This actuator applies a downward force to the brush for selectively controlling the brush scrubbing or contact pressure applied to the interior tire surface being cleaned. The brush is moved arcuately about the pivot axis of shaft 152 by a double acting reciprocative actuator 158 mounted underneath mount 48 in transverse alignment with and connected to actuator 150. In the illustrated example, actuators 150 and 158 are constituted by double acting reciprocative air cylinders, and motor 148 is constituted by a reversible air motor. Actuators 150 and 158 and motor 148 are supplied with pressurized air by lines 159 (FIG. 1).

Referring now to FIG. 5 in particular, the brush as thus supported can be swung transversely by actuator 158 within a tire along the aforementioned arcuate path in contact with the tire interior surface at a contact pressure which is selectively controllable by appropriate operation of actuator 150. The brush is swung back and forth within the tire as depicted in FIG. 5. To this end, actuator 158 is extended and contracted in alternate sequence. A piston rod position indicator 160 (FIG. 3) is mounted for conjoint movement by arm 162 with the actuator piston rod. Spaced apart sensors 164, 166 depend from mount 48 and sense the position of the indicator 160 and, in combination with the FIG. 9 control system, cause the aforementioned operation of actuator 158. To control or adjust the extent of such arcuate movement of the brush, the positions of sensors, 164, 166 may be adjustable with respect to actuator 158 by securing them to mount 48 at selected positions using slotted bolt attachments 168, as shown (FIG. 3)—the greater the spacing between sensors 164, 166, the greater the arc travelled by the brush, and vice versa.

In the illustrated example, the brush further is driven alternately in opposite directions of rotation, depending upon the direction in which the brush is moving within the tire. Preferably, the brush is driven in a direction of rotation which corresponds to the direction of movement of the brush within the tire so that the brush in effect "walks" along the interior tire surface. Upon completion of each transverse brush path, the limits of which are depicted in broken lines in FIG. 5, the direction of brush rotation is reversed and the brush is "walked" in a reverse direction towards the opposite side of the tire.

The cleaning fluid application and removal apparatus first applies a detergent-water solution to the interior tire surface prior to initiation of the scrubbing process by brush 28. This solution suspends the material being removed from the tire interior and at the same time provides brush lubrication. The apparatus further, upon completion of the scrubbing process, removes the now dirty solution and then automatically rinses the tire interior with fresh water. Both fluids are removed from the tire interior by vacuum application.

Referring now in particular to FIGS. 4 and 5, the detergent-water solution is delivered to the tire interior via a detergent addition line 170. Rinse water is delivered to the tire interior via line 172 and is applied thereto by spaced apart nozzles 174, 176 adjacent the brush. The aforementioned detergent-water solution and rinse water are stored in appropriate containers (not shown) which are connected with lines 170 and 172, respectively.

As illustrated in FIG. 4, the detergent-water solution or rinse water, as the case may be, is evacuated from the tire interior via a vacuum nozzle 178 and four vacuum lines 180 (two lines not shown) which are attached to motor 148 by support 182 and mounting bolts 184 for conjoint movement with the brushes. The vacuum nozzle is positionable at appropriate vertical spacing with the tire interior surface and preferably is positioned at close clearance therewith by appropriate adjustment of the vacuum line support 182 along vertical adjustment slots 186 with respect to mounting bolts 184. In the illustrated example, therefore, the vacuum nozzle can sweep transversely inside the tire along an arcuate path generally parallel to the path of the brush 28 described previously by operating actuator 158 in a generally similar manner. During such movement of the vacuum nozzle, tire rotation is continued so that the vacuum nozzle removes fluid as it collects at the bottom of the tire by gravity. In this instance, the brush is stationary but may rub along the interior tire surface as the vacuum nozzle sweeps back and forth inside the tire, although additional retraction means could be provided for lifting the brush out of contact with the interior tire surface during operation of the vacuum nozzle.

Figure 9:
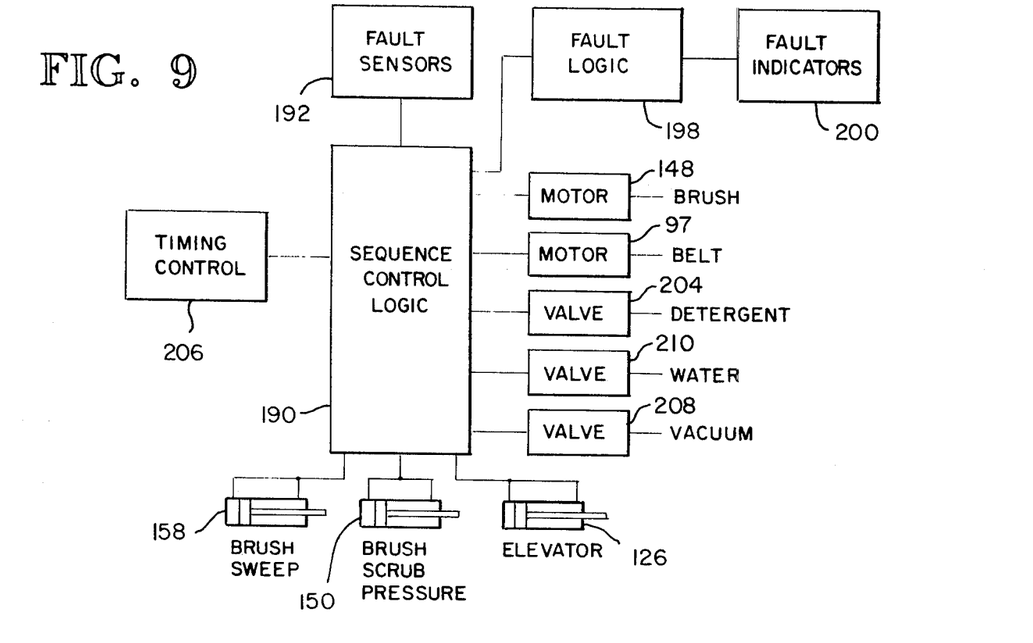
FIG. 9 is a schematic block diagram of the control system of the FIG. 1 cleaner.

The automatic control system of the FIG. 1 applicator will now be described with reference to FIGS. 6-10 of the drawings. Appropriate position sensors sense the position of the tire drawer, and presence of a tire adjacent the cleaning head, while additional sensors monitor other system conditions and produce appropriate fault indications, if necessary. The control system depicted schematically in FIG. 9 is made up of conventional pneumatic and electrical components. Certain of the sensors depicted in FIG. 6 are further illustrated in further detail in FIGS. 2 and 4, with the remaining sensors and other schematically represented control system components being illustrated generally in schematic block diagram form and described hereinafter.

Figure 10:
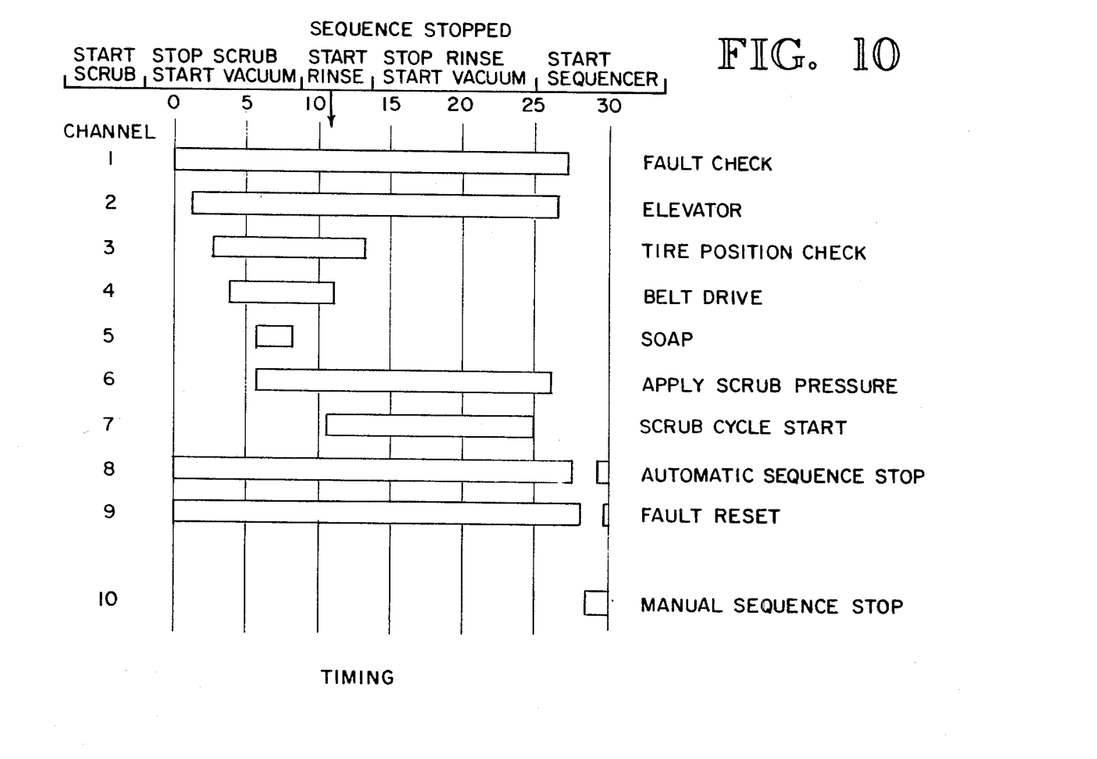
FIG. 10 is a timing diagram depicting operation of the FIG. 1 cleaner.

The FIG. 9 control system includes a sequence control logic circuit which provides sequential multiple channel output signals at appropriate time intervals during the cleaning cycle, as depicted in FIG. 10. In the illustrated example, the sequence control logic circuit accomplishes one operational control cycle on a thirty (30) second basis, although the actual cycle time is somewhat longer than thirty (30) seconds due to a dwell time period during the certain steps. In the illustrated example, the control system is semi-automatic in nature, although the system could be fully automated if desired. In the example, therefore, the tire drawer is first withdrawn manually to its FIG. 6 position and a tire is loaded thereon. The tire drawer then is advanced to its FIG. 7 closed position, at which an appropriate drawer position or fault sensor produces a signal indicative that the tire drawer is closed. Following is a brief description of the channel output signal logic functions effected by the sequence control logic circuit which will be further understood with reference to FIG. 10 of the drawings.

Channel 1—Fault Check: A sequence control logic circuit 190 now receives signals from the drawer position sensor, together with signals from additional system condition or fault sensors 192. Among these additional signals are signals indicative of detergent solution and rinse water supply. The tire drawer position sensor is illustrated schematically at 192 and is illustrated in further detail in FIG. 2 in which it is referenced by numeral 194. Sensor 194 responds to the proximity of probe 196 which projects from the end of the mounted drawer slide. If any of the aforementioned sensors present a fault indication, a fault logic circuit 198 is actuated in response to delivery of an appropriate logic signal from the sequence control logic circuit. The fault logic circuit in turn operates an appropriate fault indicator 200, or causes the logic circuit to proceed through a fault loop and return to channel 1 without actuation of any system components. The circuit will remain in this fault loop until the fault condition is corrected. If the fault sensors all provide a no-fault indication, the sequence control logic circuit proceeds automatically through remaining channels 2-8 in sequence.

Channel 2—Elevator: The sequence control logic circuit now causes the elevator to be raised to its FIG. 8 position by appropriate actuation of cylinder 126.

Channel 3—Tire Position Check: The sequence control logic circuit repeats the aforementioned fault test with respect to sensor 202 (FIG. 4) to determine whether a tire is in position adjacent the cleaning head. This sensor responds to the position of arm 130 and produces a signal indicative of the presence of a tire when that arm has been swung to its elevated position during spreading of the tire beads. A fault indication at this point, indicative that a tire is not in the proper position, will produce an appropriate fault indication and again cause the sequence control logic circuit to enter into its fault loop. In this instance, circuit 190 further causes the elevator to be lowered to its FIG. 7 position.

Channel 4—Belt Drive: The circuit 190 causes the drive belt to begin rotational movement by appropriate actuation of motor 97 and clutch 101.

Channel 5—Soap: The circuit 190 causes the detergent-water solution to be applied to the tire interior surface via inlet line 172 by opening valve 204. This valve controls flow of the detergent-water solution through line 172.

Channel 6—Apply Scrub Pressure: The circuit 190 causes the brush to be engaged with the tire interior surface at a selected contact pressure by appropriate actuation of cylinder 150 and simultaneously causes the brush to begin rotating by appropriate actuation of motor 148.

Channel 7—Scrub Cycle Start: The circuit 190 now causes the brush to begin to sweep arcuately within the tire by appropriate actuation of cylinder 158.

Channel 8—Automatic Sequence Stop: Circuit 190 thereupon stops the automatic control sequence as indicated in FIG. 10. A timing control circuit 206 (FIG. 9) controls the time duration of the ensuing scrub, vacuum, rinse and vacuum operations as follows. Circuit 206 causes the brush motor 97 to shut down at the end of the desired scrub time period. Thereupon, vacuum is applied to the tire interior via nozzle 178 by opening valve 208 associated therewith for a second time period in order to remove the now dirty detergent solution while cylinder 158 continues to sweep nozzle 178 transversely within the still rotating tire. At the end of the second time period, rinse water is applied to the tire interior surface via nozzles 174, 176 by opening valve 210 associated therewith for a third time period. At the end of the third time period, the vacuum procedure is repeated in order to remove rinse water.

Channel 9—Fault Reset: Circuit 190 resumes sequencing upon completion of the aforementioned timed operations and routes an appropriate reset logic signal to the fault logic circuit 198. The fault logic circuit alternately may be reset by curing the fault condition, or manual reset by means is now shown.

Channel 10—Manual Sequence Stop: The circuit 190 causes the elevator and the now clean tire to be lowered to the FIG. 7 position.

To adjust the FIG. 9 control system for tires which require varying cleaning times, circuit 206 may be adjusted so that the four time periods determined thereby afford the desired scrub time, first vacuum time, rinse time, and second vacuum time, as the case may be.

Although one preferred embodiment of the invention has been illustrated and described herein, variations will become apparent to one of ordinary skill in the art. For example, to provide fully automatic operation of the FIG. 1 cleaner, the tire drawer or horizontal conveyor 10 and stop 18 may be moved automatically, as described herein by suitable means and the FIG. 9 control system modified accordingly. The invention is not to be limited to the specific embodiment illustrated and described herein and the true scope and spirit of the invention are to be determined by reference to the appended claims.

The embodiments of the invention in which an exclusive property or privilege is claimed are as follows:

1. A method of cleaning the interior of a tire, comprising moving the tire to a position in which a cleaning means is positioned within the inner circumference of the tire, engaging the tire at its outer tread portion and causing relative motion of the tire and cleaning means in a direction substantially normal to the tire axis until the cleaning means is positioned in the tire interior, and rotating the tire adjacent the cleaning means during cleaning thereof.

2. A method of cleaning the interior of a tire comprising:
positioning the tire so as to locate a means for cleaning the tire within the inner circumference thereof; then moving the tire in a direction substantially normal to its axis towards the cleaning means to bring the beads of said tire into contact with a pair of members associated with said cleaning means to spread said beads apart to admit the cleaning means into the tire interior; and
rotating the tire during the cleaning thereof, whereby the tire beads are spread apart to admit the cleaning means as the tire is moved toward the cleaning means.

3. A tire cleaner, comprising:
cleaning means for cleaning an interior tire surface during rotation of the tire; and
tire moving means, the tire moving means including means for moving a tire until the tire is in a first position in which the cleaning means is positioned within the inner circumference of the tire, means operative when the tire is in its first position for engaging the tire at its outer tread portion and causing relative motion of the tire and cleaning means in a direction substantially normal to the tire axis until the cleaning means is positioned in the tire interior, and means for rotating the tire adjacent the cleaning means during the cleaning thereof.

4. The tire cleaner of claim 3, wherein the tire moving means includes support means for supporting the tire at this outer tread portion, means for moving the support means transversely with respect to the cleaning means for causing rotation of the tire, and means for causing relative motion of the support means and cleaning means towards and away from each other for positioning the cleaning means in the tire interior.

5. The tire cleaner of claim 3, further comprising a stationary frame to which the cleaning means is secured.

6. The tire cleaner of claim 5, wherein the tire moving means includes support means for supporting the tire at its outer tread portion, means for moving the support means transversely with respect to the cleaning means for causing rotation of the tire, and means for moving the support means towards and away from the cleaning means for positioning the cleaning means in the tire interior.

7. A tire cleaner comprising:
tire support means for supporting a tire; and
cleaning means for cleaning the interior surface of a tire supported by the tire support means, the cleaning means including pivot means mounted such that the pivot means is positioned within the inner circumference of the tire supported by the tire support means, brush means pivotally supported by the pivot means for pivotal motion along an arcuate path adjacent the interior surface of the tire supported by the tire support means around a pivot axis perpendicular to the tire axis, first actuator means for moving the brush means along said arcuate path for cleaning the interior of the tire, and second actuator means for moving the brush means toward and away from the pivot means for varying the pressure of the brush means against the tire interior surface.

8. The tire cleaner of claim 7, wherein the tire support means includes a support surface underlying the tread portion of the tire adjacent the brush means.

9. The tire cleaner of claim 7, wherein the brush means comprises a brush supported for rotation about a brush axis substantially parallel to said pivot axis, and means for rotating the brush about said brush axis.

10. A tire cleaner comprising:
cleaning means for cleaning an interior tire surface during rotation of the tire;
tire rotation means operatively associated with the cleaning means for causing rotation of the tire during cleaning;
tire transport means operatively associated with the cleaning means for moving the tire into position for cleaning; and
tire spreading means operatively associated with said cleaning means to spread the tire beads for admitting said cleaning means into the tire interior, said spreading means including a pair of members movable between first and second positions relative to each other, said members in said first position adapted to engage opposed tire beads as said transport means moves said tire into cleaning position, and means for moving at least one of the members away from the other member to said second position in response to contact of said one member with said tire beads.

11. The tire cleaner of claim 10 wherein said members comprise movable rollers, and said moving means includes means for moving said rollers in opposite directions along respective arcuate paths during movement of said tire by said tire transport means.

12. The tire cleaner of claim 10 further including means mounting said tire spreading means for translating a portion of the force exerted by said tire beads against said members as a result of contact therebetween into a force which causes said relative motion of said members.

13. A tire cleaner comprising:
cleaning means for cleaning an interior tire surface during rotation of the tire;
tire rotation means operatively associated with the cleaning means for rotating the tire during cleaning;
tire transport means operatively associated with the cleaning means to move the tire into position for cleaning;
tire spreading means operatively associated with the cleaning means to spread the tire bead during cleaning; and
semi-automatic control means connected to the cleaning, rotation, transport and spreading means to coordinate the actions thereof, said semi-automatic control means including position sensing means for sensing the position of the tire being cleaned; sequence control logic means connected to said position sensing means for controlling the sequence of the cleaning, rotation, transport and spreading means; and response means connected to said sequence logic control means, said cleaning, rotation, transport and spreading means for controlling the actions thereof.

14. A tire cleaner as in claim 13 further comprising:
fault sensing means connected to said sequence control logic means for sensing faults in said tire cleaner.

* * * * *